Aug. 23, 1966
TAKESHI ADACHI ET AL 3,268,729
SYSTEM OF GENERATING PULSED NEUTRONS OF
NARROW PULSE WIDTH
Filed Dec. 3, 1962
2 Sheets-Sheet 1
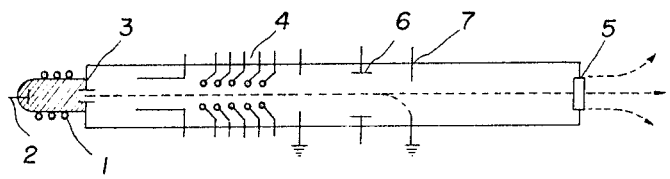
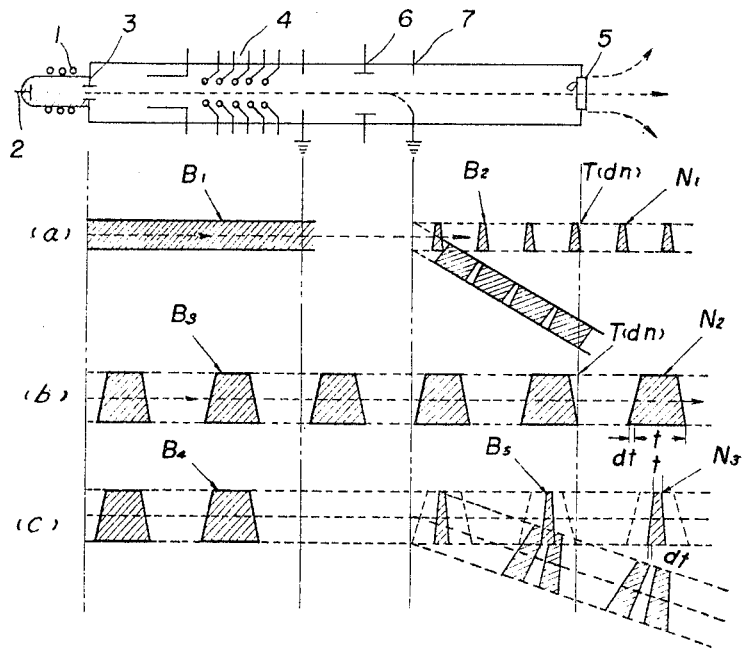
INVENTOR.
Takeshi Adachi
BY George B. Oujevolk
Attorney

United States Patent Office 3,268,729
Patented August 23, 1966

3,268,729
SYSTEM OF GENERATING PULSED NEUTRONS OF NARROW PULSE WIDTH
Takeshi Adachi, Kizuki, Kawasaki-shi, and Ogawa Kazuyuki, Yokosuka-shi, Japan, assignors to Tokyo Shibaura Electric Co., Ltd., Kawasaki-shi, Japan
Filed Dec. 3, 1962, Ser. No. 241,909
Claims priority, application Japan, Dec. 5, 1961, 36/43,438
2 Claims. (Cl. 250—84.5)

This invention relates to an improved system of generating pulsed neutrons wherein deuteron ions are accelerated to bombard a tritium target for generating neutrons by the reaction of $T(dn)He^4$.

Apparatus for generating pulsed neutrons of narrow width are required to subject a nuclear reactor, critical assembly or sub-critical assembly to the pulsed neutrons to measure the variation with time of the neutron flux in said nuclear reactor or assembly whereby to determine the nuclear characteristics of the assembly.

A principal object of this invention is to provide improved pulsed neutrons having very narrow pulse width of less than 0.1 microsecond and very steep build up and attenuation.

Another object of this invention is to provide a system of generating pulsed neutrons in which a great number of neutrons can be generated during pulse generating periods.

Still another object of this invention is to limit as far as possible back ground neutrons having an energy level of 2.35 m.e.v. due to the reaction of $D(dn)$ in periods other than those wherein the required pulsed neutrons are to be generated.

While the specification concludes with claims particularly pointing out and distinctly claiming the subject matter which is regarded as this invention, it is believed that the invention will be better understood from the following description taken in connection with the accompanying drawings, in which:

FIG. 1 is a schematic representation of a prior neutron generating device;

FIG. 2 is a diagram for explaining the manner of generating an ion beam and neutrons in the device of FIG. 1, wherein (a) and (b) respectively show the operations of conventional D type and P type pulsed neutron generating systems and (c) shows the operation of the pulsed neutron generating system in accordance with this invention;

Figure 3:
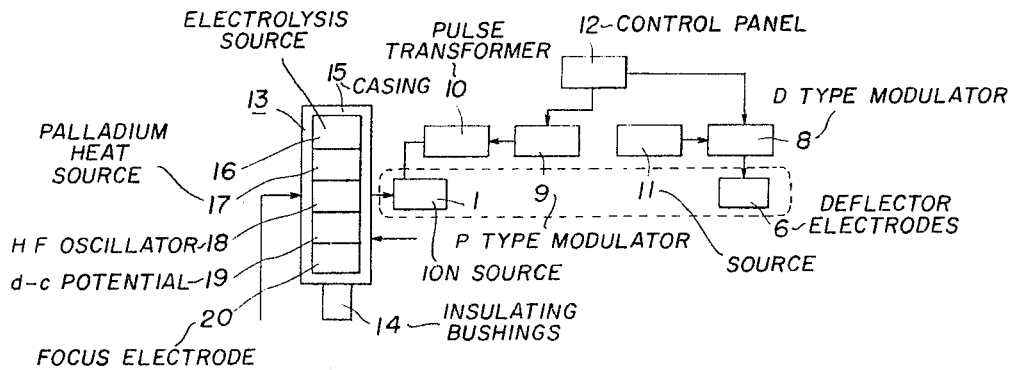
FIG. 3 is a schematic block diagram of the generating system embodying this invention.

Referring now to FIG. 1 of the accompanying drawings, which illustrates schematically the construction of a device for generating pulsed neutrons, the device comprises an ion source 1 in which gaseous deuterium is subjected to a high frequency power arc to produce ions. By impressing across a probe 2 and a canal 3 contained in the ion source 1 and ejecting voltage with such polarity as to bias positively the probe 2, said ions are ejected into an accelerating tube 4 through the canal 3. Said ions are accelerated in the accelerating tube 4 to impinge upon a target 5 to generate neutrons. In this regard, there are the following three types of methods to convert the beam into pulses for generating pulsed neutrons:

(1) A type; in which the accelerating voltage is pulsed.
(2) P type; in which the ejecting voltage impressed upon the probe in the ion source is pulsed.
(3) D type; wherein electrostatic deflector electrodes and a slit are interposed between the accelerating tube and the target and pulsed deflecting voltage is impressed upon the deflector electrodes to modulate the ion beam into pulses whereby to bombard the target with the pulsed beam to generate pulsed neutrons.

However, the A type is not so frequently utilized because it is inferior to the P and D types from the standpoint of pulse width, wave form, electric power required and the like. As has been pointed out above, the ejecting voltage impressed upon the probe 2 in the ion source is of pulse form so as to provide a pulsed beam through the accelerating tube 4 as shown in FIG. 2b. Thus, this type is advantageous in that the beam travels only during the intervals in which the neutrons are to be generated so that stronger beams may be produced from the ion source. However, in the P type because it takes several microseconds between the application of the voltage to the probe 2 and the ejection of the ion beam through the canal 3 it is impossible to produce pulses having width less than said time interval. Moreover, large build up time of the pulses results in inferior wave form thereof.

In the conventional D type neutron generator, a continuous deuteron beam $B_1$, as shown in FIG. 2a, is ejected into the accelerating tube 4, and before bombarding the target 5 through a slit 7 the continuous beam is converted into a pulsed beam $B_2$ by the action of a pulsed bias voltage impressed across the deflector electrodes 6 which are located in front of the slit 7. With this method, however, it is impossible to particularly increase the magnitude of the beam at the instant at which the required pulsed neutrons $N_1$ are to be generated. Moreover, deuteron beams which are deflected away from the slit opening will impinge upon the walls comprising the accelerating tube and the slit to be adsorbed thereby as deuterium which upon receiving bombardment of the deuteron beam $B_2$ will produce neutrons by a reaction of $D(dn)He^3$ causing ground noise and hence erroneous measurement.

Accordingly a more specific object of this invention is to provide a novel pulsed neutron generator which can eliminate the above mentioned various defects of the P and D type neutron generators.

One embodiment of this invention will now be described with reference to the accompanying drawings. More particularly, in FIG. 3 illustrating a block diagram of the essential parts of the generating system of this invention, for a neutron generator of the identical construction as that shown in FIG. 1, there are provided a D type modulator 8 for providing for said deflector electrodes 6 a deflecting pulse having a width of T microseconds and a P type modulator 9 for providing for said probe 2 a pulse having a width of $T+2T$ microseconds, the output terminals of said modulator 9 being connected to the probe in the ion source 1 via a pulse transformer 10. Said D type modulator 8 is fed from an electric source 11, and the D type modulator 8 and the P type modulator 9 are both under the control of a control panel 12.

The auxiliary electric source device 13 comprises a casing 15 mounted on an insulating bushing 14 and contains therein an electric source for heavy water electrolysis 16, a palladium heating source 17, a high frequency oscillator 18, a source of probe potential 19 and a source of first focusing potential 20. Although not shown in the drawings, it should be understood that the source of probe potential 19 and the source of first focusing potential 20 are controlled from a suitable control table and other sources are preset to suitable conditions.

Figure 4:
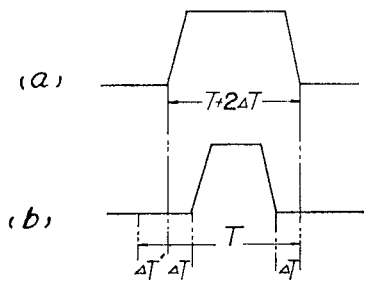
FIGS. 4a and 4b represent the P type and D type pulses, respectively, generated by this invention.

It is assumed now that by manipulating the control panel 12 the P type modulator 9 is operated to impress a P type pulse of the wave form as shown in FIG. 4a upon the probe in the ion source 1 of the neutron generator to cause it to emit a deuteron ion beam having a width of $T+2\Delta T$ microseconds.

Assuming that the time interval required for the ions to travel from the ion source 1 to the deflector electrodes 6 be ΔT′ microseconds, the D type modulator 8 is controlled to generate and impress across said deflector electrodes 6 a D type pulse voltage having a pulse width of T and lagging in time phase by $\Delta T + \Delta T'$ microseconds with respect to the P type pulse, as shown in FIG. 4b. If the pulsed deuteron beam $B_4$ as shown by FIG. 2c is permitted to impinge upon the target 5, it is clear that such a beam will generate pulsed neutrons of the same configuration as will pulsed deuteron beams $B_3$ as shown in FIG. 2b. According to this invention, however, the beam is deflected as shown by FIG. 2c by applying a pulsed bias potential to the deflecting electrode 6.

At the instant when a potential having a width T is impressed upon the deflecting electrodes 6 the bias potential will be cancelled to permit the beam to impinge upon the target 5 through the slit 7 to produce pulsed neutrons $N_3$ of narrow pulse width as shown in the right hand portion of FIG. 2c.

Thus it will be clear that according to this invention it is possible to increase the magnitude of the ion beam emitted from the ion source 1 when compared with the prior D type generator as shown in FIG. 2a, thus greatly increasing the number of neutrons generated by the reaction of Td. In addition since the ion beam travelling through the accelerating tube 4 is of the P type, that is, the beam travels only during the interval in which the ion beam is emitted, the load of the ion source is substantially reduced.

Moreover after a proper time delay subsequent to the emission of pulsed ion beam from the ion source 1 according to the P type scheme, pulses are generated from the D type modulator to cause the ion beam modulated by said pulses to impinge upon the target 5 so that it is not only able to generate pulsed neutrons having a very narrow width of the order of about 0.1 microsecond, but also to improve their wave form. Furthermore, inasmuch as the amount of the beam deflected away from the slit opening is much smaller than that of the D type generator, number of objectionable neutrons caused by the reaction of Dd is greatly reduced.

Characteristics of the pulses produced by the neutron generator according to various specifications prepared by the inventors are shown in the following table.

TABLE

| D type pulses | | P type pulses | | |
|---|---|---|---|---|
| Pulse width, μs. | Time of build up and attenuation, μs. | repetition | Pulse width, μs. | Time of build up and attenuation, μs. |
| 100 | 5 | 1–1,000 variable | 110 | 5 |
| 10 | 2 | 1–1,000 variable | 13 | 2 |
| 1 | 0.2 | 1–10⁴ variable | 13 | 2 |
| 0.1 | 0.05 | 1–10⁴ variable | 5 | 2 |
|  |  | 5–10⁴ fixed |  |  |

As has been described hereinabove this invention provides an improved pulsed neutron generator which can produce large amount of neutrons with extraordinary short time of build up and attenuation which are especially suitable for measuring the nuclear characteristics of nuclear reactors and assemblies.

While the invention has been explained by describing one particular embodiment thereof, it will be apparent that improvements and modifications may be made without departing from the scope of the invention as defined in the appended claims.

What is claimed is:

1. A device for generating neutrons by the impinging of ions upon a target, said device including a source of ions, a target which emits neutrons when bombarded by ions, means for accelerating said ions from said source toward said target, a first impulse means for applying electrical ejecting potentials to said ion source in the form of pulses to cause the ejection from said source of groups of ions in the form of ion pulses, a diaphragm in the path of said ions between said ion source and said target, said diaphragm having a perforation therethrough, deflection means adjacent said diaphragm for deflecting ions passing from said ion source to said target, a second impulse means for applying a second pulsing potential to said deflection means to cause ions passing from said ion source to said target to sweep across said diaphragm, and means for correlating said first and second impulse means to apply said second pulsing potential to said deflection means at times such that only a portion of each of said ion pulses passes through said perforation to strike said target.

2. The device defined in claim 1 wherein said first impulse means supplies electrical pulses having a duration approximately twice the duration of the neutron pulses desired, and wherein said second impulse means supplies deflecting impulses such that ions from said ion pulses pass through said perforation for an interval of time approximately that desired for the neutron pulses.

References Cited by the Examiner

UNITED STATES PATENTS 2,276,758  3/1942  Brueche et al. _____ 331—80
2,449,786  9/1948  Lockwood _____ 313—178
2,933,611  4/1960  Faster _____ 250—84.5
2,956,169  10/1960 King _____ 250—83.6

RALPH G. NILSON, *Primary Examiner.*

JAMES W. LAWRENCE, *Examiner.*